Figure 1:
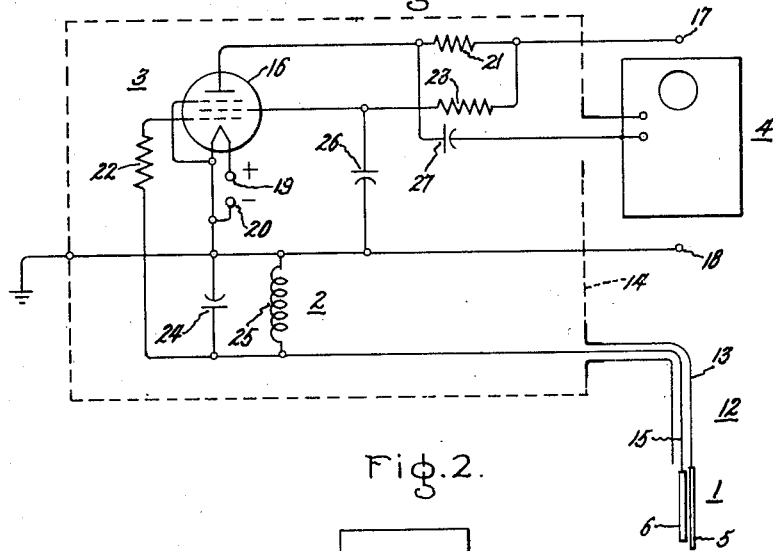

Dec. 24, 1957  R. N. BUSHMAN  2,817,814

CORONA DETECTION PROBE

Filed Aug. 13, 1953

Inventor:
Robert N. Bushman,
by Merton D. Morse
His Attorney.

United States Patent Office 2,817,814
Patented Dec. 24, 1957

2,817,814

CORONA DETECTION PROBE

Robert N. Bushman, Latham, N. Y., assignor to General Electric Company, a corporation of New York Application August 13, 1953, Serial No. 374,098

2 Claims. (Cl. 324—72.5)

My invention relates to the detection, location and measurement of corona in electric devices. More particularly it relates to apparatus for detecting, locating, and measuring such corona.

It is well known that two conductors charged to opposite polarities are surrounded by an electrostatic field. If the voltage stress at any point between the conductors exceeds the voltage at which ionization of the surrounding air will take place, breakdown of the air will occur. When the path of high stress extends from conductor to conductor, the path will completely ionize and arc-over. When the high stress path does not extend completely between the conductors or when insulation having a higher dielectric strength than air is interposed over a part of the path, arc-over cannot take place. The phenomenon of ionized air or gas extending over part of the path between two conductors is generally known as corona. When the voltage stress is produced by alternating current, corona forms at each half cycle, the formation being progressive and occurring in bursts having very sharp wave fronts. When the stress is brought about by direct voltage the bursts occur at random.

Corona discharges produce intense local heating. When they occur in electrical devices or apparatus, the electrical insulating material is subjected to this heat to the end that repeated discharges cause breakdown of the insulation, short circuiting and failure of the device.

The deleterious effects of corona discharge on electrical insulation and equipment have been known for some time and various methods have been devised to detect and measure corona so that equipment can be properly designed to minimize such effects and prevent failure. One of the most widely used means to detect corona takes advantage of the fact that corona discharges emit waves of radio energy. This energy is picked up in a receiver and measured to give an indication of the amount of corona present. However, this and other known means, while they will detect and measure corona, are not capable of locating the source of the discharge. The usual way of locating such corona has been to place the equipment under test in a dark room and observe the discharge visually. The disadvantages and cumbersomeness of such a procedure are obvious, particularly with larger pieces of equipment.

The need for a means and method of not only detecting and measuring electric corona but of determining its exact location on electrical equipment, both static and dynamic, is great. Only by locating in a convenient manner as well as detecting and measuring corona can the particular equipment or machine be designed to avoid corona and early possible failure.

An object of my invention is to provide a means for locating corona on exposed parts of electrical machinery.

Another object of my invention is to provide a means for locating and measuring electrical corona which is light and portable and convenient to use.

Briefly, in accordance with my invention the electrical disturbance caused by a corona discharge signal is picked up by a capacitive probe used to probe or explore the equipment being tested, fed into a resonant circuit, the wave train produced amplified by a conventional amplifier and fed to an indicating means. When the indicating means such as an oscilloscope is operated at the same frequency as the voltage applied to the equipment under test, the corona signal appears as a visual disturbance in the oscilloscope trace.

Figure 2:
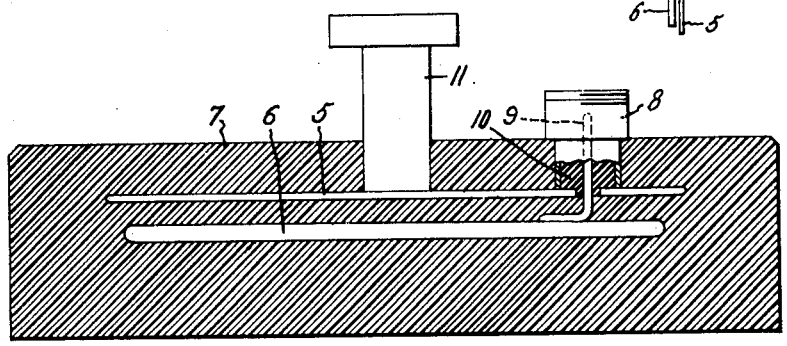
Figure 3:
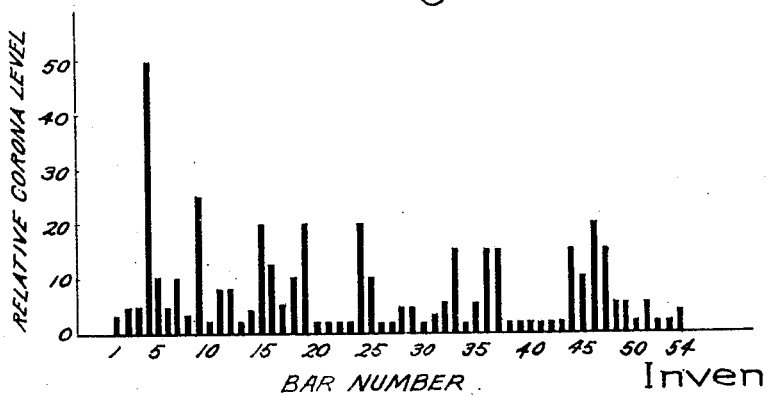

The features of my invention which are believed to be novel are set forth in the claims appended hereto. My invention will, however, be better understood from a consideration of the following description and the drawing in which Fig. 1 is a schematic diagram of the electrical cricuit utilized in my invention; Fig. 2 is a longitudinal sectional view of a typical probe used to locate and pick up corona signals and Fig. 3 is a graphical representation of data taken on a typical electrodynamic machine.

In Fig. 1 there is shown the electrical circuit and apparatus of my invention comprising a capacitive probe 1, a resonant circuit 2, a conventional amplifier 3 and a cathode ray oscilloscope 4.

Probe 1, which is in effect a capacitor, is shown in detail in Fig. 2 as consisting essentially of two metal plates 5 and 6 embedded in a solid block 7 of synthetic resin or otherwise insulated. The upper metal plate 5 is somewhat longer and wider than plate 6 in order to shield the latter to prevent its picking up any stray corona effects from the upper side of the probe structure. Plate 5 is electrically and physically connected to bushing or coupling 8 while plate 6 has attached thereto a contact 9 which is insulated from plate 5 and coupling 8 by an insulating material 10 which may be the same as that which makes up block 7. Plate 5 is also attached to lug 11 which serves to connect the probe to an insulating pole, not shown, for use in searching a device for corona.

Probe 1 is connected to the electrical indicating means through shielded cable 12, plate 5 being connected through coupling 8 to the shield 13 of the cable which in turn is connected to the shield 14 of the indicating and measuring means. Plate 6 is connected to the central conductor 15 of cable 12 through contact 9.

Plates 5 and 6 are embedded in a plastic or resinous material for several reasons. If relative corona values are to be obtained for various points on the exopsed windings of an electrical device, for example, the probe must be positioned the same distance from the winding for each reading. Since it is impractical to manually hold the probe continuously exactly the same distance away from the device, some sort of mechanical support is indicated. Metallic supports cannot be used inasmuch as they in themselves would be likely to cause corona. The ideal support would be a solid insulating material having a dielectric constant of 1, the same as air. However, since air has a relatively low breakdown or ionizing voltage, the insulating material should also have a relatively high dielectric strength or ionizing voltage as compared to air which latter would ionize under test conditions where stresses of over about 50 volts per mil are encountered. The insulation is also made thick enough as shown in Fig. 2 to reduce the stress below the point where ionization of the air film between the probe and the device will occur. The insulation should be capable of being molded around the metallic probe structure without voids. Typical insulating materials which are merely illustrative of those which may be used in this respect are polystyrene, acrylic resins, vinyl resins, and various polyester resins. Others will occur to those familiar with the art.

It will be appreciated, of course, that probe 1 is shown in only one of the many shapes and sizes which it may assume, the only requirement being that it include the usual capacitor elements and be properly insulated for the conditions to which it is subjected. For example, probe 1 may be made in the form of a sphere of insulating material containing therein capacitor elements which are connected as shown in Fig. 2. Alternatively, if only low voltage stresses of less than about 50 volts per mil are to be encountered, such as would not ionize air, the insulating sheathe may be eliminated entirely with insulation used only to support the open air capacitor and properly space it from the test device.

That part of my invention which translates the signal picked up by probe 1 into a visual indication consists of a resonant circuit 2 connected in the grid circuit of amplifier 3, and a cathode ray oscilloscope 4, the amplifier and resonant circuit being shielded as shown at 14 and grounded.

Amplifier 3 is conventional in design and is shown as merely illustrative of many such circuits which may be used. The amplifier utilizes a pentode 16 such as an 1U4 election discharge device, for example, supplied with power from terminals 17 and 18. The filament power supply is applied at terminals 19 and 20. A plate load is furnished by resistor 21 while resistor 22 provides a grid leak bias. The proper voltage supply for the screen grid is assured by means of voltage dropping resistor 23. Coupled in the grid circuit of valve 16 is resonant circuit 2 consisting of capacitor 24 and inductance coil 25. Degeneration of the signal delivered by device 16 is prevented by decoupling capacitor 26. The enhanced signal from the amplifier circuit is fed to cathode ray oscilloscope 4, which is shown conventionally, by coupling capacitor 27.

In operation the equipment is interconnected as shown in Fig. 1 with the oscilloscope synchronized to sweep, by conventional means not shown, at the frequency of the test voltage and the component parts of the resonant circuit selected to provide a natural resonant frequency which will not interfere with commercial electrical discharges such as those of television, radio, and the like.

Probe 1 is mounted by means of lug 11 to an insulating pole, not shown, of appropriate length. With the device to be detected subjected to the test voltage the bottom of probe 1 is rested on those parts of the test device which are to be investigated for corona. With no corona present, the indication on the oscilloscope screen will be only that due to the background noise level of the test equipment which will remain quite constant. This is shown graphically in Fig. 3 as the short, rather uniform lines having a comparative level of about 2. The bar number pertains to the particular bar of an alternating current generator being tested which in this particular case was one rated at 13,800 volts with a corona test voltage of 8,000 volts applied line to ground.

When the probe is moved to a location where corona is present, the latter is picked up by the probe as sharp voltage pulses. To amplify these voltage pulses would be difficult inasmuch as the extremely short duration and steep wave front of the pulses would require the amplifier to operate at high radio frequencies. The oscilloscope used to display the pulse would also be required to have a very high writing speed. To eliminate the need for a high frequency amplifier and high writing speed oscilloscope my invention uses a resonant circuit which may be adjusted to have any desired frequency and one which will not interfere with commerical radiation. A typical frequency for resonant circuit 2 is 10,000 cycles.

Corona pulses are passed from probe 1 to resonant circuit 2 consisting of capacitor 24 and inductance coil 25, shock exciting the resonant circuit to oscillate at its natural frequency. The losses in the circuit due to the ohmic resistance of the inductance gradually damp the oscillations, but each succeeding pulse reactivates the circuit. The damped wave trains are fed into the amplifier 3, amplified, and the amplified signal fed to the cathode ray oscilloscope 4. When the frequency of the sweep circuit of the cathode ray oscilloscope is synchronized with that of the test voltage, the original corona pulse is shown as a long vertical trace on the screen or one which rises above the background noise level. The more intense the corona, the longer is the trace. When the sweep circuit of the cathode ray oscilloscope is synchronized at the frequency of the test voltage, the visual indication of the corona pulse appears at those places on the trace corresponding to the maximum positive and negative points of the applied test voltage.

When an indication has been secured of the presence or absence of corona at any one point, the probe is moved on to the next point to be tested. The present apparatus will locate and positively and quantitatively measure the corona of electrical devices, care being taken not to introduce the probe into confined regions having such strong electric fields that the probe itself might promote formation of corona and give a false indication. However, the apparatus of my invention is unfailing in detecting and measuring corona at all exposed portions of electric devices.

If it is desired to find the corona starting voltage at any one point rather than the corona at any one voltage as above, the probe may be placed at points where corona was observed, or at any desired location, and the voltage raised step-wise from a comparatively low level to the first indication of corona on the oscilloscope screen.

The proper balancing of the various elements in the electrical circuit shown to attain any desired resonant frequency and amplification will occur to those skilled in the art. However, typical components used to attain a resonant frequency of 10,000 cycles, which will not interfere with commercial types of radiated energy, are as follows:

| | |
|---|---|
| Potential across contacts 17–18 _____ volts __ | 67½ |
| Potential across contacts 19–20 _____ do ____ | 1½ |
| Resistor 21 _____ megohm __ | 1 |
| Resistor 22 _____ megohms __ | 10 |
| Resistor 23 _____ do ____ | 1.5 |
| Capacitor 24 _____ microfarads __ | 0.003 |
| Inductance 25 _____ millihenries __ | 60 |
| Capacitance 26 _____ microfarads __ | 0.002 |
| Capacitance 27 _____ do ____ | 0.003 |

While the above description of the operation of my invention has been made with reference to the use of alternating voltage as the test voltage, it will be obvious that D. C. devices may also be tested. In the latter case it is preferable to reduce the horizontal width of the trace to a small value in order more accurately to read the height of the traces since the corona pulses will occur at random.

Various modifications of my invention may be made which do not depart from the spirit thereof. For example, in lieu of an oscilloscope I may use a peak-reading voltmeter or other suitable indicating means which will allow the amplitude of the corona signal to be read directly. Audible or other indicating means may also be provided.

Another modification relates to the suppression of the voltage due to the electrostatic field produced by the low frequency testing voltage. This voltage is picked up by the probe, and while no resonance occurs, it is amplified. If it is considered desirable, this voltage may be suppressed by the insertion of a high pass filter between the amplifier and oscilloscope.

Other modifications will occur to those skilled in the art which do not depart from the scope of my invention.

What I claim as new and desire to secure by Letters Patent of the United States is:

1. Apparatus for passing corona pulses to an electrical indicating means from the exposed parts of electrical devices having a test voltage applied thereto, said apparatus comprising a portable capacitive probe having two metal plates spaced by electric insulation from one another and from the bottom of said probe which in use has its said bottom resting on said exposed parts of said devices, one of said plates being longer and wider than the other of said plates which is between it and said bottom of said probe to shield said other plate from stray corona effects coming from the side of said probe opposite its said bottom, and a cable having a shield conductor electrically connected to said shielding plate of said probe and a central conductor electrically connected to said shielded plate of said probe and electrically insulated from said shield conductor of said cable and said shielding plate of said probe.

2. Apparatus for passing corona pulses to an electrical indicating means from the exposed parts of electrical devices having a test voltage applied thereto, said apparatus comprising a portable capacitive probe having two metal plates embedded in solid electrically insulating material and spaced from one another and the bottom of said material of said probe which in use has said bottom resting on said exposed parts of said devices, one of said plates being longer and wider than the other of said plates which is between it and said bottom of said material to shield said other plate from stray corona effects coming from the side of said probe opposite said bottom, and both of said plates being separated from said bottom of said material by a thickness thereof which reduces the electric stress below the point where ionization of the air film between said probe and said device will occur, and a cable having a shield conductor electrically connected to said shielding plate of said probe and a central conductor electrically connected to said shielded plate of said probe and electrically insulated from said shield conductor of said cable and said shielding plate of said probe.

References Cited in the file of this patent

UNITED STATES PATENTS

| 2,199,757 | Rohde | May 7, 1940 |
| 2,558,091 | Johnson | June 26, 1951 |

FOREIGN PATENTS

| 524,862 | Great Britain | Aug. 16, 1940 |
| 557,088 | Great Britain | Nov. 3, 1943 |

OTHER REFERENCES

"Corona Test Equipment for Solid Dielectric Cable," article in Electronic Industries, May 1948, pages 14–15.